(No Model.) 5 Sheets—Sheet 1.

A. D. EMERY.
METHOD OF WEAVING PLAIN ONE PLY FABRICS.

No. 415,144. Patented Nov. 12, 1889.

(No Model.)

A. D. EMERY.
METHOD OF WEAVING PLAIN ONE PLY FABRICS.

No. 415,144. Patented Nov. 12, 1889.

Witnesses—
Ira R. Steward
Wm N. Capel

Inventor—
A. D. Emery
by Townsend & MacArthur
Attorneys—

(No Model.) 5 Sheets—Sheet 3.

A. D. EMERY.
METHOD OF WEAVING PLAIN ONE PLY FABRICS.

No. 415,144. Patented Nov. 12, 1889.

Witnesses—
Ira R. Steward
Wm. F. Capel

Inventor— A. D. Emery
by Townsend & MacArthur
Att'ys

(No Model.) 5 Sheets—Sheet 4.
A. D. EMERY.
METHOD OF WEAVING PLAIN ONE PLY FABRICS.
No. 415,144. Patented Nov. 12, 1889.

Witnesses
Ira R. Steward
Inventor A. D. Emery
by Townsend & MacArthur
Atty's (No Model.)

A. D. EMERY.

METHOD OF WEAVING PLAIN ONE PLY FABRICS.

No. 415,144. Patented Nov. 12, 1889.

Witnesses—
Ira R. Steward
Geo. S. Capel

Inventor— A. D. Emery
by Townsend & MacArthur
Attorneys

N. PETERS, Photo-Lithographer, Washington, D. C.

UNITED STATES PATENT OFFICE.

ABRAM D. EMERY, OF TAUNTON, MASSACHUSETTS.

METHOD OF WEAVING PLAIN ONE-PLY FABRICS.

SPECIFICATION forming part of Letters Patent No. 415,144, dated November 12, 1889.

Application filed May 18, 1888. Serial No. 274,259. (No model.)

*To all whom it may concern:*

Be it known that I, ABRAM D. EMERY, a citizen of the United States, and a resident of Taunton, in the county of Bristol and State of Massachusetts, have invented a certain new and useful Method of Weaving Plain One-Ply Fabrics, of which the following is a specification.

My invention relates to the art of double weaving, or weaving plain one-ply fabrics of a width considerably greater than the width of the reed, as more broadly set forth in an application filed by me February 28, 1888, Serial No. 265,639. The method as set forth in that application consists, generally speaking, in weaving the fabric in two parts, side by side, in the loom, using two distinct weft-threads, which are simultaneously shot through the two parts of the fabric, one through each part, the weft-threads being passed by each other uniformly at one side of the loom where the center of the fabric is formed, crossing each other in their passage into opposite parts of the fabric and into a succeeding shedding, and having a predetermined relation to the two outside chain-threads of the double shedding, about which they cross.

My present invention relates more particularly to the method of manipulating the two weft-threads with reference to their relation to the two outside chain-threads at or near the center of the fabric.

In the application referred to the shedding of the outside or edge chain-threads or of the series of chain-threads to which they respectively belong was so timed with reference to the passage of the weft-threads from one part of the fabric to the other that a weft-thread at this point always passed under one of said outside or edge chain-threads and over the other, so that a regular sequence of weft-threads of over and under the chain-threads alternately was maintained in both directions throughout the completed fabric. This effect was produced by causing the outside chain-threads to move in opposite directions at each shedding and in such manner that the weft-threads always passed under the outside or edge chain-thread of the part of the fabric which it was leaving and over the corresponding edge thread of the part of the fabric next to be traversed. From this it resulted further that the weft-thread passed one over and one under each edge chain-thread, the relation of over and under depending upon the consideration whether a particular thread was approaching or leaving the half of the fabric containing the given chain-threads. The words "over" and "under," as used in this connection throughout the specification, refer to the face and back of the completed fabric opened out flat, and not to the position of the threads in the loom, where a weft-thread may be "over" a chain-thread, speaking of the relative positions of the threads in a vertical plane, but is nevertheless on the back of the completed fabric. By further variations in the manner of passing the weft-threads by each other at the center, fabrics were produced in which the weft-threads, in addition to passing over and under the chain-threads in regular order, as described, were, furthermore, crossed uniformly over and under one of said edge threads or uniformly over and under the other of said edge threads or were crossed alternately over and under one of said edge threads, and then over and under the other of said edge threads, and then over and under the first of said edge threads, and so on, or finally were crossed over and under said chain-threads alternately in the reverse order to that just described.

According to my present invention the shedding of the edge chain-threads is so timed with reference to the passage of the weft-threads at that point that a weft-thread always passes under the two edge threads or over the same, that the regular sequence of over and under the chain-threads is interrupted at this point. Throughout the rest of the fabric the sequence of weft-threads and chain-threads remains as before. This result is produced by causing the edge chain-threads or the series of threads to which they respectively belong to move in the same direction at each shedding and in such manner that a weft-thread having passed under one edge thread will likewise pass under the other at the succeeding shedding. This effect will be appreciated by observing that when the edge threads thus move together in the loom—that is, both up or both down—they are moving in such direction as to produce an opposite result in the fabric. Thus an upward movement of the upper edge thread will place it on the face of the completed fabric, while the same movement of the lower edge thread will place it on the back of the completed fabric, the relative position of face and back of the fabric being reversed in the two halves. If, therefore, the upper edge thread is up at one shedding, placing it on the face of the completed fabric, the lower edge thread will be down at the succeeding shedding, placing it also on the face of the fabric and on the same side of the weft-thread as the upper edge thread. The same is true of the other weft-thread in an opposite sense, the movement being such that when one weft-thread is over the two edge threads the other weft-thread is beneath. It is furthermore apparent from the description already given that the same edge thread will always be up at the time of the transfer and the other down, and consequently it will appear that the weft-thread approaching the center in that part of the fabric whose edge thread is uniformly up at the time of the transfer will always pass under the two edge threads, while the weft-thread approaching the center through the other half of the fabric will always pass over the two edge threads. It is immaterial of course which weft-thread shall be elected to be up at the time of the transfer, as the general result will remain the same.

Applying to a loom organized to carry out the method of weaving thus far explained the several variations in the manner of passing the weft-threads by each other at the center, as explained in my prior application there will be produced as compared with the invention described in that application still further changes due to alterations in the crossing of the threads at the center. Where before the threads uniformly crossed over and under a single edge thread, they will now cross over and under the two edge threads, or will cross between the same, or will cross first over and under the two edge threads and then between said edge threads, or the reverse, making four variations in the fabric, as before.

The methods of weaving as thus far described are independent of the particular devices or instrumentalities by which they may be utilized, as those devices and instrumentalities may be varied, according to the circumstances of the case, without departing from the spirit of my invention.

I have illustrated in the accompanying drawings, and will hereinafter describe some of the ways in which my invention may be carried into effect.

In the accompanying drawings, forming a part of this specification, Figs. 24, 26, 28, and 30 correspond to Figs. 15, 17, 19, and 21 and show the effect of reversing the operation of those figures. Figs. 23, 25, 27, and 29 correspond to Figs. 24, 26, 28, and 30, respectively, and are end views of the same taken from the side on which the center of the fabric is formed and enlarged to show the crossing of the threads. Fig. 31 is an edge view of the fabric formed by the method of always passing one thread toward the cloth. Figs. 33, 35, 37, and 39 correspond with Figs. 5, 7, 10, and 12 and show the effect of always turning the bottom thread toward the cloth. Figs. 32, 34, 36, and 38 correspond to Figs. 33, 35, 37, and 39, respectively, and are end views of the same taken from the side on which the center of the fabric is formed. Fig. 40 shows an edge view of the fabric formed by the method just described.

The apparatus illustrated in the drawings, and which will now be described in detail, is substantially identical with the apparatus shown and described in my previous application, before referred to, in its structural features, with such variations only as are necessary to illustrate my present invention.

For the purpose of facilitating a detailed description of the passage of the weft-threads through the chain-threads and their positions in passing from one shedding to the next, one is designated by the numeral 1 in all the drawings, and is shown shaded, and the other weft-thread is designated by the numeral 2, and is shown as plain.

Referring now more particularly to Figs. 1 to 4, the numerals 14, 15, 16, and 17 designate a series of warp-threads, divided into an upper chain 10, which passes over the whip-roll 11, and a lower chain 12, which passes over a whip-roll 13. The series of threads which will be outermost on the front of the loom are designated by the numeral 14 in the upper shedding and by 16 in the lower shedding, as will be seen more clearly in the enlarged views of the sheddings. The series of warp-threads indicated, respectively, by the numerals 14, 15, 16, and 17 are controlled, respectively, by the heddles 6, 7, 8, and 9, the heddle 6 controlling one half of the upper chain, designated by the numeral 14, the heddle 7 controlling the other half of the threads, designated by the numeral 15, the heddle 8 controlling one half of the threads of the lower chain, designated by the numeral 16, and heddle 9 controlling the other half of the lower chain, designated by the numeral 17. The heddles move in pairs, shedding the upper and lower chain simultaneously to form two paths for two shuttles, indicated by the numerals 3 and 4. The shaded weft-thread 1 is indicated as attached to the shuttle 3, and the plain weft-thread is indicated as attached to the shuttle 4.

Numeral 5 indicates the reed through which the chain-threads pass in the ordinary manner.

18 indicates the completed fabric.

The numerals 3 and 4 indicate the shuttles, in practice placed in boxes, those located at the front of the loom, where preferably the center of the fabric is formed, being constructed so as to be reversible in position for the purpose of passing the shuttles and weft-threads by each other from the top to the bottom and from bottom to top, respectively, for the purpose of weaving the fabric continuous at that point. These reversible shuttle-boxes are one of the possible means of passing the threads by each other at the center, but form of course no essential part of my invention.

I have not deemed it essential for the purpose of illustrating my present invention to show the peculiar mechanism used by me for revolving these shuttle-boxes, it being understood that the mechanism is capable of reversing the position of the shuttles in either direction, as may be required, and passing the weft-threads by each other by a movement approximating a movement of revolution, so that the shuttles will be reversed in position and their respective weft-threads passed by each other at the center of the fabric preparatory to the next passage of the shuttles.

The passing of the weft-threads by each other at the center is fully explained in the application filed by me February 28, 1888, Serial No. 265,639, before referred to, and forms no part of my present invention.

The sequence of operations, according to my present invention, consists of four successive sheddings and four passages of the shuttles to complete the passage of a weft-thread from and back to an initial position and through the two halves of the fabric. The sequence will be the same from whatever point it may be assumed to begin.

Figure 1:
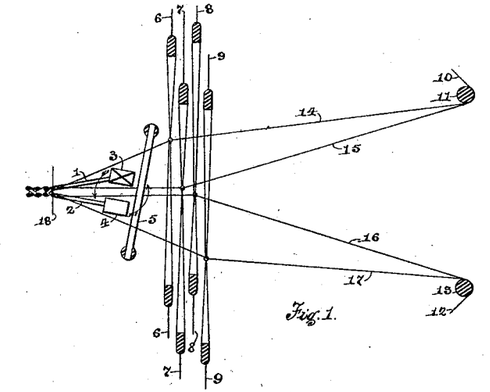
Figures 1, 2, 3, and 4 illustrate diagrammatically the component parts of a loom, so far as they are essential to the understanding of my invention, arranged to illustrate the four sheddings and flights of the shuttles, which complete the sequence of operations.
Figure 2:
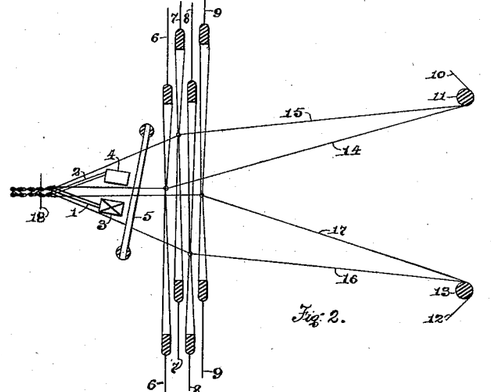

In the drawings I have assumed, for the sake of illustration, that the shuttles in Fig. 1 have just been driven from the rear selvage to the front of the loom, and are shown in position in the front reversible shuttle-boxes. Preliminary to this passage of the shuttles and weft-threads the heddles 6 and 8 were raised, as shown, and the heddles 7 and 9 depressed, heddles 6 and 7 shedding the upper chain-threads 14 and 15 for the passage of the upper shuttle 3, and the heddles 8 and 9 shedding the lower chain-threads 16 and 17 for the passage of the lower shuttle 4. The shaded thread 1 is represented as extending from the selvage on the rear of the loom to the shuttle 3 in the front box. The plain thread 2 is represented as extending from the bottom selvage on the rear to the shuttle 4 in the front box. The threads are in position to be beaten up by the reed 5 into the fabric 18 and form the first pick—that is, there will have been shot through the fabric weft-threads extending from edge to edge, which will consist of shaded thread 1 in the upper half and plain thread 2 in the lower half. In this position the two outside chain-threads, as shown more fully in Figs. 5, 15, 24, and 33, are both lifted, the weft-thread 1 passing under thread 14 and weft-thread 2 passing over chain-thread 16 in their respective sheddings. The words "over" and "under" here, as elsewhere, are used in the sense above referred to. While the reed is beating up, the front shuttle-boxes are reversed in position to pass the threads by each other to the opposite parts of the fabric, as indicated in Fig. 2, the top shuttle being taken to the bottom and the bottom shuttle to the top by the movement of revolution indicated by the arrows in Fig. 1. The second shedding is then made by depressing heddles 6 and 8 and elevating heddles 7 and 9, thereby forming two paths for the shuttles—one above and one below—the thread 15 being carried to the top of the upper chain and thread 14 below, the threads 16 and 17 of the lower chain being correspondingly changed in position so as to cross the chain-threads of both sheddings over the pick or continuous layer of weft-thread which has been carried through the fabric by the previous operation. This forms a plain crossing, by which the outside thread 14 of the top chain is carried to the center and outside thread 16 of the lower shedding is carried to the bottom, respectively, as more fully shown in Figs. 7, 17, 26, and 35, in which figures also the shaded weft-thread is shown beaten up in place in the top half of the fabric, where it was laid by the passage of the shuttle 3, as indicated in Fig. 1 and in enlarged views 5, 15, 24, and 33, and plain thread 2 is shown in the bottom half, where it was laid by the passage of shuttle 4.

Figure 3:
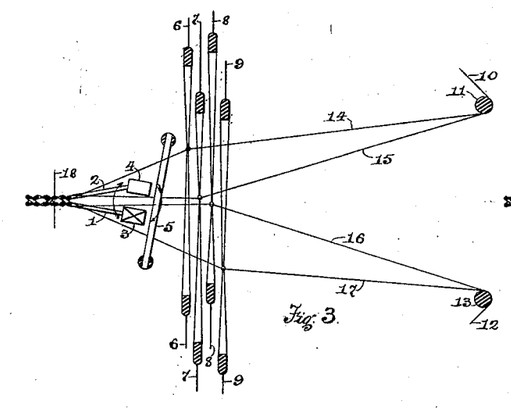

In Fig. 2 the shuttles are shown as having passed from the front boxes to the rear, and the threads are then beaten up into the fabric, as indicated in Fig. 3, with the shaded thread in the lower half and the plain thread in the upper half.

Figure 4:
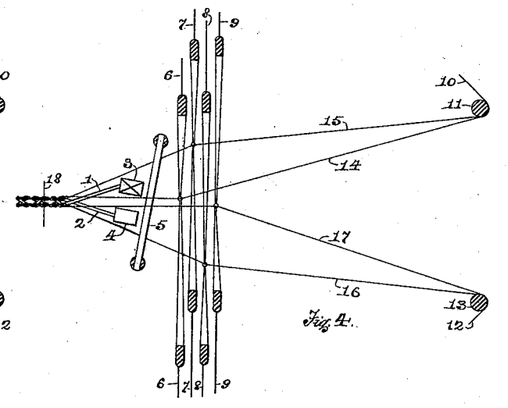

In Fig. 3 the shedding is the same as that shown in Fig. 1, and the shuttles are shown as being in the front boxes, with the shuttle-threads extending from them to the selvages on the rear of the loom, shuttle 4, carrying thread 2, being at the top, and shuttle 3, carrying thread 1, being at the bottom, which is the position they occupied in Fig. 2, the shuttles at the rear not having been reversed, but returned through the same paths from which they were received. The threads are now beaten up into the fabric, as shown in Fig. 4. It will be seen that two plain threads 2 are laid side by side in the top half, and likewise two picks of shaded thread 1 are likewise placed in the bottom half of the fabric.

In Fig. 4 the shedding is the same as in Fig. 2, and the weft-threads are transferred from bottom to top and top to bottom and are in position to be thrown to the rear, (thread 1 in the top and thread 2 in the bottom,) the movement of the shuttles to the rear of the loom completing the sequence of the passages of the threads across the chain, and placing them in the position shown in Fig. 1. This process is continued on indefinitely to the completion of the fabric.

Figure 7:
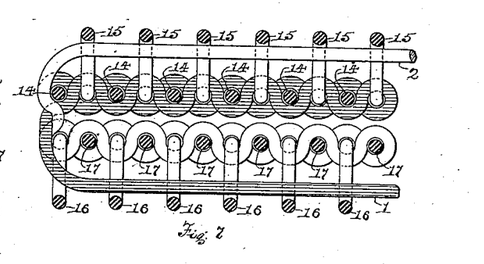
Figure 8:
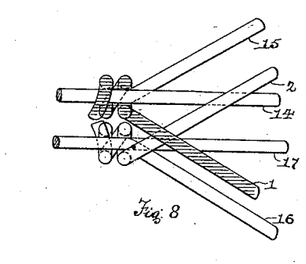
Figure 9:
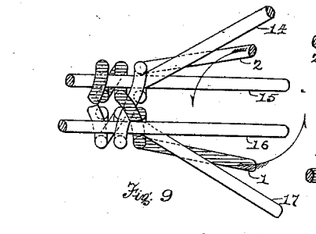

It will be observed that in the process of transferring the weft-threads at the center they pass uniformly either under or over the two edge threads 14 and 16, and when one passes under the other passes over. Thus, in the first transfer, as indicated in Figs. 7 and 8, the shaded thread passes under thread 14 in its first passage from the rear to the front of the loom and then passes under thread 16 in its second passage from the front to the rear, the words "over" and "under" referring to the face and the back of the fabric, as already explained. So likewise the plain thread in the same figures is seen to pass over edge thread 16 in its first passage from rear to front, and then over thread 14 in its second passage from front to rear. This formation holds throughout the various figures of the drawings, illustrating modifications of the method in other respects, and results from the manner of manipulating the weft-threads with reference to the edge chain-threads, whereby the weft-threads are caused to bear the same relation to both edge threads with respect to their position of over and under in the completed fabric. Practically this result is brought about by causing the two edge threads, or the series of threads to which they belong, to move together in the loom up and down, so that a weft-thread approaching the center and having passed under one edge thread at one passage will likewise pass under the other edge thread in its succeeding passage in the opposite part of the fabric. It will also be apparent that according to this manner of manipulating the chain-threads a weft-thread approaching the center through a given half of the fabric will pass uniformly under or uniformly over the two edge threads, dependent upon which half of the fabric has its edge thread elevated with respect to the face of the completed fabric when the weft-threads are approaching the center. In the drawings I have shown the edge thread of the upper half as uniformly occupying this position, so that a weft-thread approaching the center through the upper half of the fabric will always pass beneath the two edge threads and the other weft-thread will always pass over the edge threads, but it will be understood that this is a mere selection and that the arrangement might be reversed without departing in any manner from my invention as explained, the only effect of reversing the operation being that the weft-thread approaching the center through the lower half will then pass under and the other weft-thread over the two edge threads.

The operation of passing the weft-threads by each other at one side of the loom and then into a succeeding shedding in opposite parts of the fabric has the effect, as fully explained in my prior application before referred to, of crossing the threads in a certain predetermined relation to the edge threads. Without repeating the explanations made in that application, it is sufficient at this time to state the fact that the passage of the weft-threads into opposite parts of the fabric and into a succeeding shedding crosses these weft-threads in that part of the fabric. The particular manner of crossing, as described in that application, is here modified by the change in the sequence of weft-threads and chain-threads, as now described. It is true of my present invention as of the invention described in the application referred to that the thread which lies next to the cloth side of the loom, in passing at the center, crosses over the other weft-thread in the completed fabric.

Figure 18:
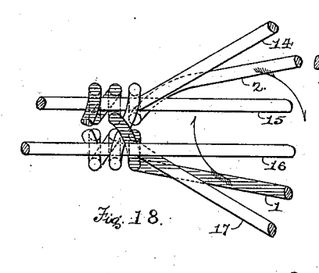
Figure 19:
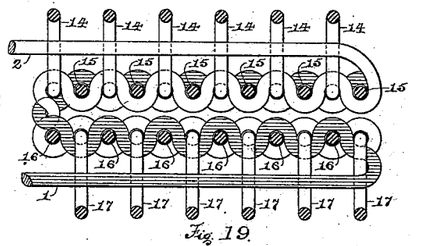

Referring now to the first transfer, as illustrated in Figs. 7 and 8, it will be observed that the shaded thread passing next the cloth side of the loom crosses over the plain thread 2, but not, as in my prior application, with an edge thread between it and the plain thread. This is due to the fact that the shaded thread while crossing over the plain thread is caused by the timing of the shedding, as described, to pass under both edge threads, while the plain thread, for the same reason, passes over both edge threads. As a result of these conditions, the weft-threads cross each other by what I term "a short cross" between the two edge threads, making a half turn or short cross at that point in the fabric. The effect in the completed fabric is seen in the first transfer at the top of Fig. 43. This formation results throughout all the figures where a weft-thread crosses over the other and at the same time passes under the two edge threads. It is evidently the fact, however, as already explained, that a weft-thread approaching the center through a given half of the fabric—the upper half in this case—always passes under the two edge threads. If, then, in addition, such thread is caused to lie next the cloth side in passing the other weft-thread, the result will always be a cross or half turn between the two edge threads. According to the special arrangement here shown, a weft-thread turned toward the cloth from the upper position will cross the other weft-thread between the two edge threads. Assuming now that the shaded weft-thread is turned toward the cloth from a lower position, as illustrated in Figs. 18 and 19, the crossing will be modified, as shown in the completed fabric, in the second transfer from the top of Fig. 43. The weft-thread in this case, being turned toward the cloth, crosses over the other weft-thread, but approaching the center through the lower half it passes over the two edge threads, and the other weft-thread, for the same reasons, passes under the two edge threads, making thereby a long cross of the weft-threads over and under the two edge threads. Briefly, if a weft-thread is turned toward the cloth from an upper position, it will form a short cross between the two edge threads, and if it is turned toward the cloth from a lower position it will form a long cross over and under the two edge threads.

From the explanations now made the four variations in the method of weaving illustrated by the four sets of figures, 5 to 13, 14 to 22, 23 to 31, and 32 to 40, will be readily understood. In all these variations of the method, as illustrated by the drawings, the edge chain-threads or the series of threads to which they respectively apply move together in the loom up and down with the uniform result, as already explained, that the weft-threads in transferring pass either under or over the two edge threads, one passing under and the other over.

Figures 5, 6:
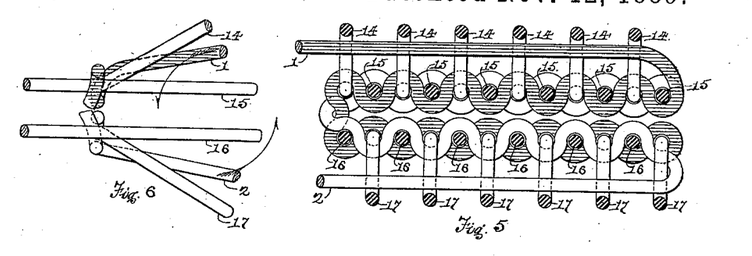
Figs. 5, 7, 10, and 12 correspond to Figs. 15, 17, 19, and 21, respectively, and, as compared with those figures, show the result of altering the method of passing the threads by each other by turning the shuttles from top to bottom toward the fabric.
Figs. 6, 8, 9, and 11 are enlarged end views of the several sheddings, taken from the side on which the center of the fabric is formed and are designed to illustrate more fully the crossing of the threads at that point.
Figure 13:
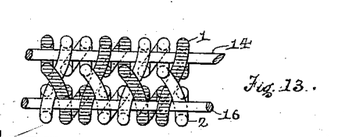
Fig. 13 represents a side view of the middle edge of the fabric when completed, showing the position of the threads for a portion of the continuous fabric.
Figure 14:
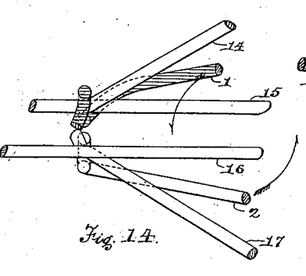
Figs. 14, 16, 18, and 20 correspond to Figs. 15, 17, 19, and 21, respectively, and are end views of the same taken from the side on which the center of the fabric is formed and enlarged to show the crossing of the threads.
Figure 15:
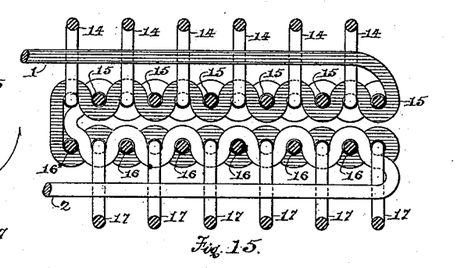
Figs. 15, 17, 19, and 21 illustrate in cross-section the positions of the various threads of the fabric in the corresponding figures on the first sheet of drawings as they appear separated and enlarged.
Figure 16:
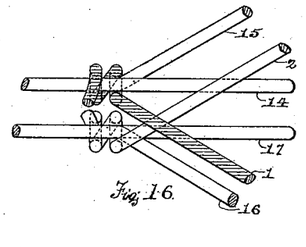
Figure 17:
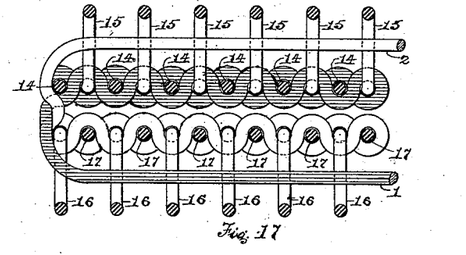

Depending upon the condition, which has been fully explained, whether a particular weft-thread is passed next the cloth side from an upper or lower position, certain modifications in the crossing of the threads are produced. Thus, in Figs. 5 and 13, illustrating the special method wherein the weft-threads are uniformly turned toward the cloth from an upper position—that is, passed next the cloth side—the short cross between the two edge threads is uniformly produced at each transfer, for the reasons already explained.

In the special method illustrated in Figs. 32 to 40, wherein the weft-thread is always turned toward the cloth from a lower position in transferring, the long cross over and under the two edge threads is uniformly produced.

In the third special method, (illustrated in Figs. 14 to 22,) wherein the two previous methods are combined, as it were, a weft-thread is turned toward the cloth at the first transfer from an upper position, and at the second transfer from a lower position, making a short cross and a long cross alternately.

In the fourth special method (illustrated in Figs. 23 to 31) the method last described is reversed, a weft-thread first being turned toward the cloth from a lower position and then from an upper position, making a long cross and a short cross alternately.

It is apparent, of course, that the last two methods mentioned are substantially the same and produce substantially the same results in the fabric, inasmuch as the two weft-threads are the same in color in the completed fabric, and it is immaterial, so far as the fabric itself is concerned, at what particular point the loom shall produce first a short cross and then a long cross, or the reverse, so long as this alternation remains constant. It is also apparent that both of these methods are merely the result of compounding or combining the two methods first described, the only real variation in the fabric depending upon the circumstance whether a thread is turned toward the cloth from an upper or lower position.

Still further changes may be introduced into the method, following the principles already explained, without departing from the spirit of my present invention. Thus a weft-thread might be turned toward the cloth from a lower position for two successive transfers, and so on; or, in fact, this order of turning and transferring might be adopted for any definite number of times, producing only the variation in the fabric that the long cross and the short cross would succeed each other in the fabric, according to the predetermined system; or the long cross and the short cross could be produced, as described, in a regular order, as desired, without departing in any manner from my invention as now explained.

All these methods of variation are, however, deducible from and included in the principles of operation as now explained.

Figure 10:
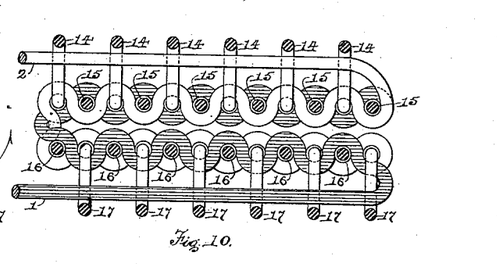
Figure 11:
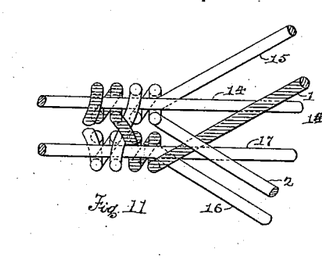
Figure 12:
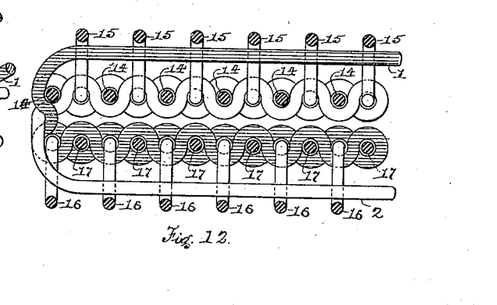
Figure 45:
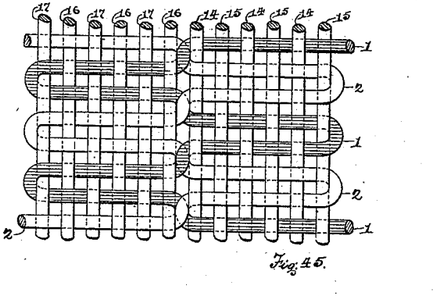
Fig. 45 illustrates a full-width fabric opened out, which is seen in edge view, Fig. 13, and which is formed by always turning the weft-thread of the upper shedding toward the cloth to the bottom shedding.

Referring now to the specific operations illustrated in the figures referred to it will be seen in examining Figs. 5 to 12, illustrating the process of always turning the weft-thread from an upper position toward the cloth in transferring, that there are four sheddings to complete the passage of a weft-thread from and back to an initial position. In Fig. 5, which is a cross-section of the shedding, as shown in Fig. 1, the edge threads 14 and 16 are raised, as described, while the adjoining chain-threads 15 and 17 are depressed to form the paths for the two weft-threads 1 and 2. Fig. 6 is an enlarged end view of the same. The thread 1 is shown as passing over the thread 15 and under edge thread 14 of the top shedding, and thread 2 as passing under thread 17 and over edge thread 16 of the bottom shedding, the words "over" and "under" here being used, as throughout the specification, with reference to the face of the completed fabric. In this position the threads are beaten up into the fabric and are then passed by each other at the center, which operation is accomplished by revolving shuttle-boxes, as described, the shaded thread 1 lying next the cloth side by the movement of revolution indicated in Fig. 6. The weft-threads are then passed into the second shedding, as shown in Fig. 7, which is an enlarged cross-section of Fig. 2. In this shedding the four series of chain-threads are reversed in position, as described, the series 15 17 being carried up and the series 14 16 being carried down, so that the shaded thread 1, which previously passed under edge thread 14, now passes under edge thread 16, and the plain thread 2, which previously passed over edge thread 16, now passes over edge thread 14. As the shaded thread lies next the cloth in the passage of the threads by each other it will cross over the thread 2, for the reasons more fully set forth in my prior application referred to, and as it also passes under the two edge threads it will cross over thread 2 between the two edge threads, as illustrated in Figs. 13 and 45. The third shedding is illustrated in Fig. 10, which is an enlarged side view in section of Fig. 3, and corresponds in all respects with Fig. 5, the series of chain-threads 14, 15, 16, and 17 having been again reversed preparatory to the return of the weft-threads from the back to the front of the loom. The weft-threads return through this shedding in the same path as in the second shedding, they being only transferred or reversed at the front of the loom to form the center of the fabric. In this shedding, however, the weft-threads are returned, as said, to the front of the loom and into position for the second transfer, which is the same as the first in this respect, that the weft-thread is turned toward the cloth from the upper position; but whereas before the shaded thread was in the upper position the plain thread is now in the upper position, and hence will lie next the cloth in passing at the center and will cross over the shaded thread in the completed fabric. In passing into the next shedding (shown in Fig. 12,) the same short cross will be formed between the two edge threads, and the weft-threads being correspondingly reversed in position as compared with the first transfer. The center of the fabric as formed by this method of turning the threads 1 and 2 is shown in Fig. 13, the threads 1 and 2 being alternately over each other, and the thread that is passing from the top to the bottom is uniformly over the one passing from the bottom to the top, and the thread passing from top to bottom is under both outside threads, while the one passing from the bottom to the top is over both outside threads. The effect will be seen in the opened-out fabric, Fig. 45, in which it will be observed that the weft-thread which is over the other in passing is under both chain-threads 14 and 16, while the thread which is under in passing is over both threads 14 and 16. It will also be seen that the thread which is over is alternately the shaded thread and the plain thread. This is due to the fact that the thread which is turned toward the cloth is alternately the shaded and the plain thread. This follows from the fact that each thread passes through the same half of the fabric for two successive sheddings, and that the transferring takes place every second shedding, and from the further fact that the transferring, according to the methods now under consideration, takes place in the same direction and from the same upper position. It will also be seen that four picks or sheddings are required to complete the sequence of the weft-threads in all respects, it being observed that the third and fourth sheddings are the same as the first and second sheddings, and that the relation of the weft-threads 1 and 2 to the chain-threads 14 and 16 are in all respects the same, except that the weft-threads exchange places in sheddings 3 and 4 as compared with the positions held by them in sheddings 1 and 2.

Figures 29, 30, 31, 38, 40:
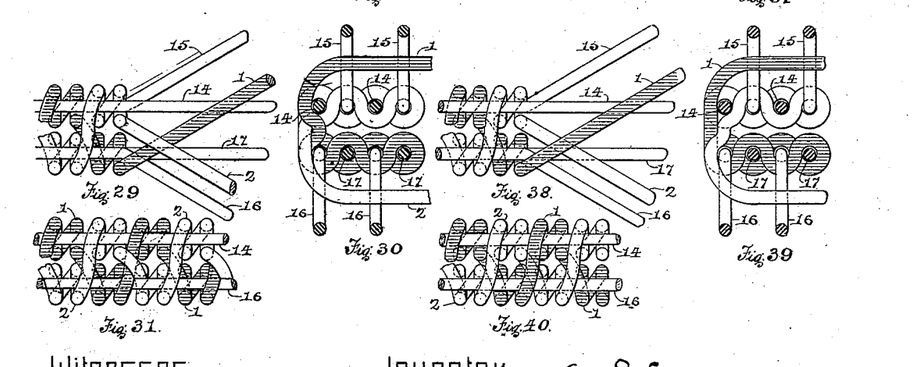
Figures 32, 33, 34, 35, 36, 37:
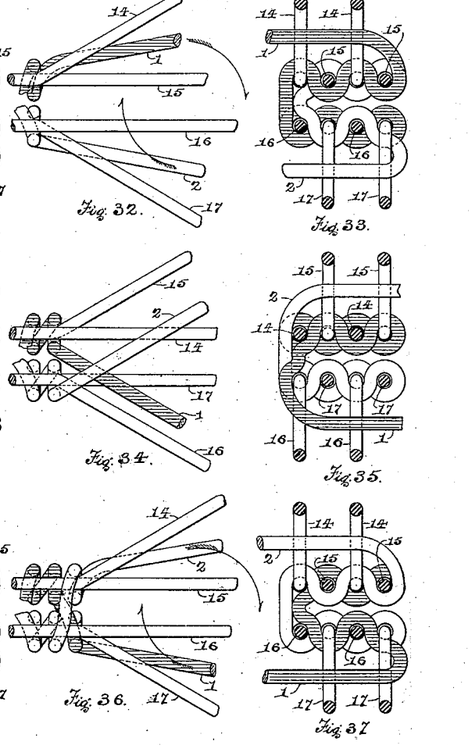
Figure 46:
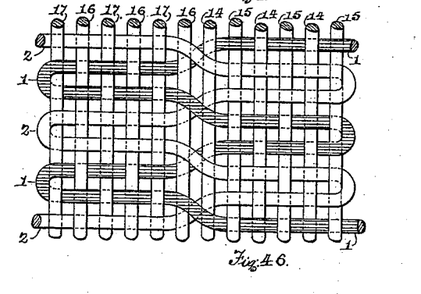
Fig. 46 illustrates a full-width fabric opened out, which is seen in edge view in Fig. 40, and which is formed by always turning the thread of the bottom shedding toward the fabric to the top shedding.

In Figs. 32 to 40 I have illustrated four sheddings which are analogous in all respects to those just described except that, in transferring, the weft-threads are turned toward the cloth uniformly from a lower position, or the reverse of that just described. In these figures, as in those just described, the edge chain-threads move together in the loom up and down. In the first shedding (shown in Fig. 33) the shaded thread 1, as before, passes over chain-thread 15 and under the edge thread 14. The plain thread 2 passes under chain-thread 17 and over edge thread 16. The weft-threads are then transferred or passed by each other at the center preparatory to passing into the next shedding with the plain thread 2 lying next the cloth side, which result is produced by turning the reversible shuttle-boxes by the movement of revolution indicated in Fig. 32. The threads are then passed into the second shedding. (Shown in Figs. 34 and 35.) In this shedding the four series of chain-threads 14, 15, 16, and 17 are reversed, as before, the two edge threads 14 and 16 moving down together, so that the shaded thread 1, which in the first shedding passed under the edge thread 14, now passes under edge thread 16, and the plain thread 2, which in the first shedding passed over the edge thread 16, now passes over the edge thread 14. From the fact, however, that the plain thread 2 was laid next the cloth side of the loom in passing, it will, as already explained, cross over the shaded thread 1 in passing into this shedding. As the plain thread 2, however, by the operations described, passes over the two edge threads while the shaded thread passes under the two edge threads, the plain thread will cross the shaded thread with the two edge threads between, making a long cross, as illustrated in Fig. 46. At the third shedding (illustrated in Figs. 36 and 37) the weft-threads are returned to the front of the loom in the same path as in the last shedding, the chain-threads having been again reversed in position, so that the plain thread in approaching the center now passes under the edge thread 14, while the shaded thread 1 passes over edge thread 16, the transfer or passing of the weft-threads by each other at the center being accomplished in the same manner or in the same direction as before—that is, the weft-thread being turned toward the cloth from a lower position. The weft-threads are then passed into the fourth shedding, as illustrated in Figs. 38 and 39, producing the same result as that described in connection with the first transfer—that is to say, a long cross of the two weft-threads over and under the two edge threads, with the single variation that, whereas before the plain thread was over the two edge threads, and the shaded thread under, the shaded thread is now over the two edge threads and the plain thread under. This is due to the fact, as already explained in connection with previous figures, that the plain thread and the shaded thread alternate with each other in position at the time of the transfer, due to the fact that each shuttle makes two picks through the same path, and that they are then turned in the same direction with reference to the cloth side and reed side of the loom. The center of the fabric, as formed by this method of turning the threads 1 and 2, is shown in Fig. 40, wherein it will be seen that the threads 1 and 2 are alternately over each other, and that the weft-thread approaching the center through the lower half of the fabric uniformly crosses over the other weft-thread, and that the weft-thread passing from bottom to top is uniformly over the edge threads 14 16, while the other weft-thread is uniformly under. The effect will be seen in the opened-out fabric, Fig. 46, in which it will be seen that the weft-thread which crosses over the other likewise passes over the two edge threads, while the other weft-thread passes beneath the two edge threads, and that the weft-threads reverse their position in this respent at each transfer.

Figures 20, 21, 22:
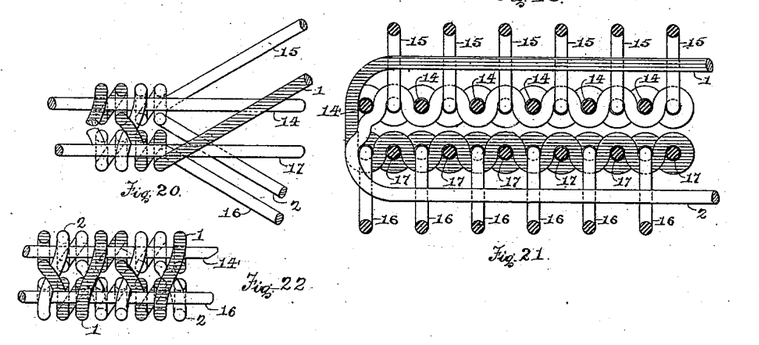
Fig. 22 is an edge view of the fabric formed by the method of passing the threads, as illustrated in the preceding figures, enlarged to show the position of the threads.
Figure 23:
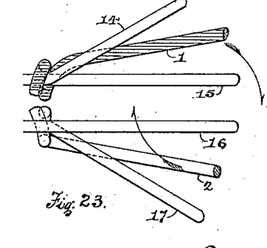
Figures 24, 26:
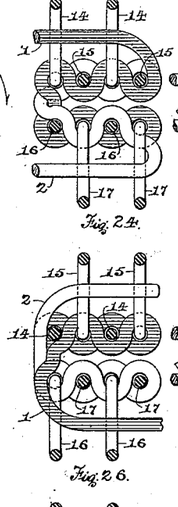
Figures 25, 27:
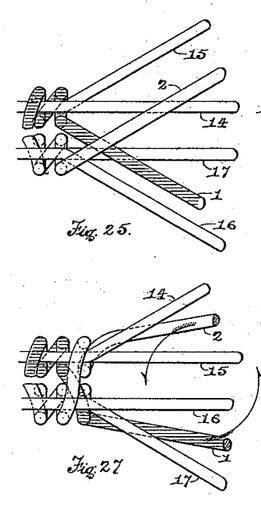
Figure 28:
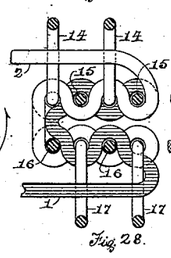
Figure 43:
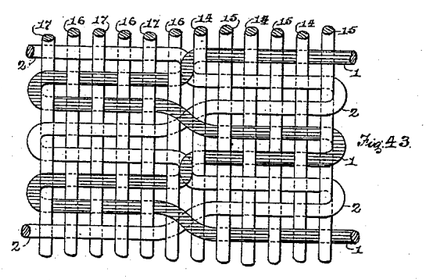
Fig. 43 illustrates a full-width fabric opened out, which is seen in edge view, Fig. 22, and which is formed by always turning the same thread toward the fabric.
Figure 44:
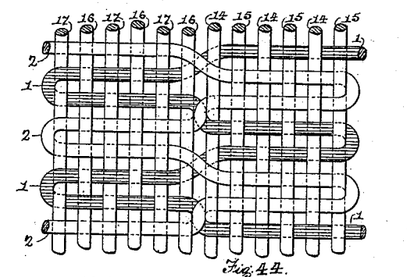
Fig. 44 illustrates a full-width fabric opened out, which is seen in edge view, Fig. 31, and which is formed by always turning the same thread toward the fabric, which in this case is the opposite thread to the one in Figs. 43 and 22.

In Figs. 14 to 22 I have illustrated four sheddings, which are analogous to those before described except that, in transferring, a weft-thread is first turned toward the cloth from an upper position and then from a lower position, and so on alternately throughout the fabric, making a short cross at the first transfer and a long cross at the second transfer, as fully explained. In the first shedding (shown in Figs. 14 and 15) the shaded thread 1, as before, passes over chain-thread 15 and under the edge thread 14, the plain thread 2 occupying the reverse relation to the corresponding chain-threads 17 and 16 of the lower shedding. The weft-threads are then passed by each other by the movement of revolution indicated in Fig. 14, whereby the shaded thread is turned toward the cloth and caused to lie next the cloth side of the loom in passing the plain weft-thread. The weft-threads are then passed into the second shedding, (shown in Figs. 16 and 17) formed precisely, as in the former methods described, by carrying down the edge threads 14 and 16 and the series of chain-threads to which they respectively belong, and carrying up the chain-threads 15 and 17 and the series of chain-threads to which they belong. In passing into the second shedding, therefore, the shaded thread, which before passed under the edge thread 14, now passes under the edge thread 16, and the plain thread, which before passed over the edge thread 16, now passes over the edge thread 14. In passing into this shedding the shaded thread crosses over the plain thread between the two edge threads, forming a short cross between the edge threads, as explained. The succeeding shedding (shown in Figs. 18 and 19) is the same as the first shedding, (shown in Figs. 14 and 15;) but now the plain thread 2 is returned through the upper shedding to the front in the same path as in the preceding shedding, while the shaded thread 1 is returned through the lower shedding to the front in the path just traversed by it. This operation places the plain thread 2 under the edge thread 14 and the shaded thread 1 over the edge thread 16, and the weft-threads, being then transferred by the movement of revolution indicated in Fig. 18, are passed into the fourth shedding, (shown in Figs. 20 and 21,) the plain thread 2 passing under thread 16, and the shaded thread passing over the edge thread 14. By the mode of transfer indicated in Fig. 18 the shaded thread—that is, the weft-thread turned toward the cloth from the lower position—crosses over the plain thread; but by the arrangement of the shedding it also passes over the two edge threads, and the plain thread passes under the two edge threads for the same reason, thus forming a long cross over and under the two edge threads, as explained. This special method is no more than a combination of the first two special methods described, the thread being turned toward the cloth from an upper position at one transfer and toward the cloth from a lower position at the second transfer, and each of these movements of transfer producing the peculiar results described in connection with these special methods, which need not be recapitulated in this connection. The center of the fabric formed by this method is seen in Fig. 22, and the effect in the opened-out fabric is seen in Fig. 43.

In Figs. 23 to 31 I have illustrated a series of sheddings which are the same in all respects as those just described, except that the manner of passing the weft-threads by each other at the center is reversed. The operations will be readily understood from the explanations already made, the sheddings remaining as in the figures just described, the variations consisting in first turning the weft-thread toward the cloth from the lower position at the first transfer and then turning the weft-thread toward the cloth from an upper position at the second transfer—that is to say, transferring in reverse order to that adopted in Figs. 14 to 22. This variation results merely in producing the relation of chain-threads and weft-threads at the second transfer which were produced in the method just described in the first transfer, and vice versa, so that no further description of these figures is deemed necessary. In fact, if it be conceived that the series of variations illustrated in these figures began at the third transfer (illustrated in Figs. 27 and 28) and then continued, the operation would become identical with the method just described.

Figure 41:
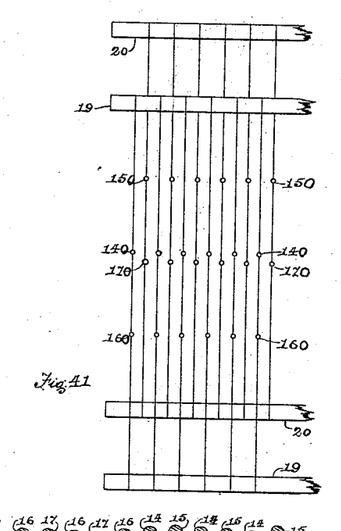
Figs. 41 and 42 illustrate modifications of the heddles, wherein the four heddles of Figs. 1 to 4 are replaced by two heddles modified in construction to produce the same result.
Figure 42:
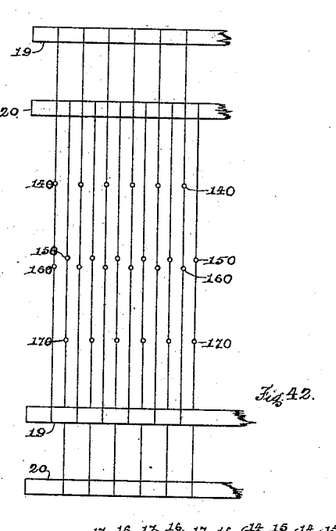

Figs. 41 and 42 illustrate modifications of the heddles, whereby the four heddles of Figs. 1 to 4 are replaced by two heddles. The heddle 19 is a combination of heddles 6 and 8, and heddle 20 is a combination of heddles 7 and 9. In the heddle 19 the cords are each provided with two eyes 140 and 160, corresponding to the two threads 14 and 16. In the heddle 20 the eyes 150 and 170 correspond to the threads 15 and 17 in the other views. By this construction the movement of heddle 19 would place the threads 14 and 16 in the same position as the heddles 6 and 8, (shown in Figs. 1 to 4, Sheet 1,) and in like manner heddle 20 would place the threads 15 and 17 in the position in which they are placed by heddles 7 and 9.

It will be understood that the method of weaving as now described is not necessarily limited to the weaving of the two halves one over the other, as illustrated in the drawings; but the invention can be equally well carried out in a loom organized to weave the two parts vertically side by side, as explained in my application before referred to. It will be also apparent, as already explained in the same application, that my invention is not limited to weaving the fabric in two equal halves, as one half may be wider than the other, as already explained.

The fabrics shown in Figs. 43, 44, 45, and 46 are the subject of other applications filed by me May 18, 1888, Nos. 274,256, 274,257, and 274,258, and I make no claim to the same in this application.

What I claim as my invention is—

The improved method of weaving which consists in simultaneously forming an opening or shed in each of the two halves of a single set of chain-threads by moving the two edge threads of both halves and the series of threads to which they belong in the same direction in the loom, then simultaneously introducing a weft-thread into each of the openings or sheds so formed from the selvage side thereof toward the center of the fabric, then repeating the shedding operation by moving the edge threads of the two halves and the series of threads to which they belong in the same direction with each other, as before, but in the opposite direction in the loom, and then again introducing weft-threads, carrying each of the latter through the half of the chain-threads just traversed by the other thread, causing the weft-threads to pass, one over and one under, two adjoining chain-threads at or near the center of the fabric.

Signed at Taunton, in the county of Bristol and State of Massachusetts, this 9th day of May, A. D. 1888.

ABRAM D. EMERY.

Witnesses:
WILLIAM T. DONNELLY,
W. T. EMERY.